No. 873,552. PATENTED DEC. 10, 1907.
M. JEWELL.
VEHICLE BRAKE.
APPLICATION FILED FEB. 11, 1907.
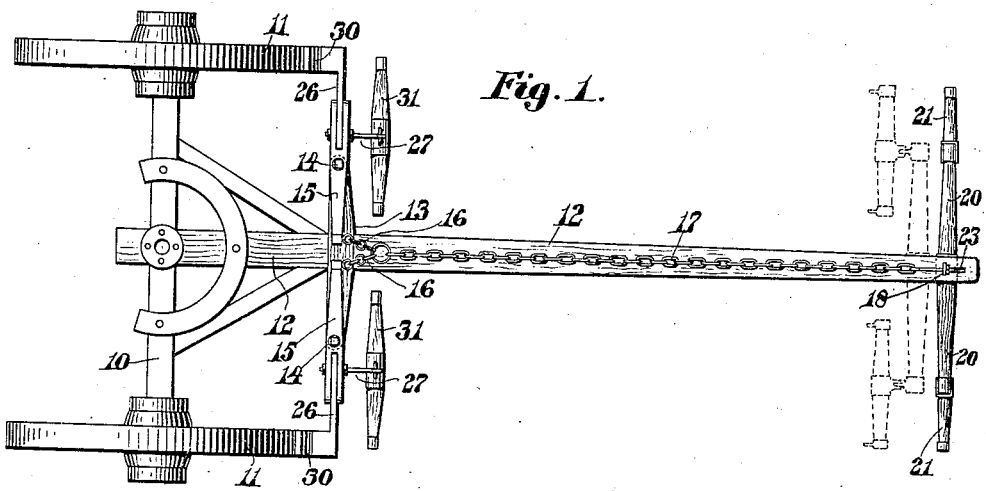
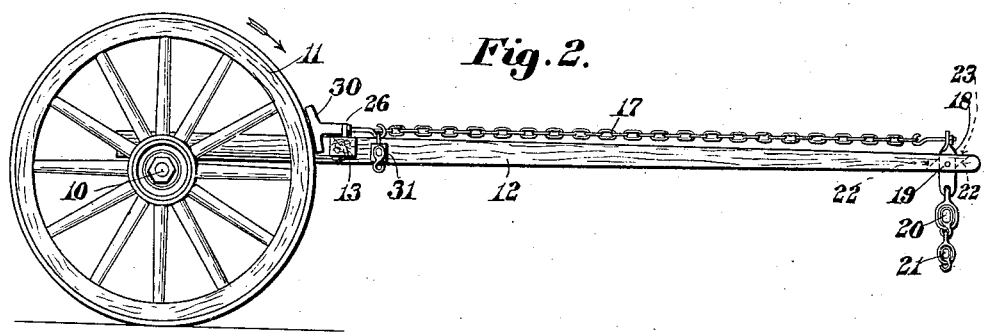
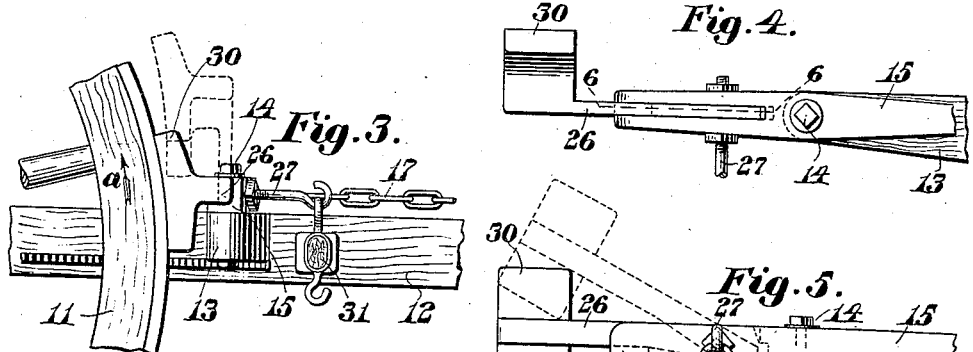
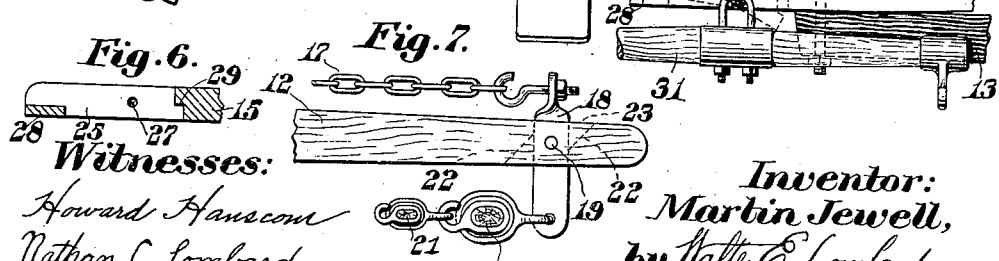
Witnesses:
Howard Hanscom
Nathan C. Lombard
Inventor:
Martin Jewell,
by Walter E. Lombard,
Atty.

UNITED STATES PATENT OFFICE.

MARTIN JEWELL, OF CLINTON, MAINE.

VEHICLE-BRAKE.

No. 873,552. Specification of Letters Patent. Patented Dec. 10, 1907.

Application filed February 11, 1907. Serial No. 356,758.

*To all whom it may concern:*

Be it known that I, MARTIN JEWELL, a citizen of the United States of America, and a resident of Clinton, in the county of Kennebec and State of Maine, have invented certain new and useful Improvements in Vehicle-Brakes, of which the following is a specification.

This invention relates to vehicle brakes and has for its object the production of a brake which automatically controls a loaded vehicle when going down hill, the brake being operated by the resisting power of the animals harnessed to said vehicle.

One of the principal objects of the present invention is the provision of a device which will operate effectually when the team is moving forward but will be thrown out of engagement at any time the vehicle is backed.

The invention consists in certain novel features of construction and arrangement of parts which will be readily understood by reference to the description of the drawings and to the claims hereinafter given.

Of the drawings: Figure 1 represents a plan of the front portion of a vehicle embodying the features of this invention. Fig. 2 represents a side elevation of the same. Fig. 3 represents an enlarged detail of the brake shoe and its operating mechanism, shown in full, in engagement with a portion of a vehicle wheel and in dotted position disengaged therefrom. Fig. 4 represents a plan view of a portion of the brake lever, the brake shoe, and the member by which it is pivotally mounted in said brake lever. Fig. 5 represents an elevation of the same. Fig. 6 represents a section on line 6—6 on Fig. 4, through the end of the brake lever showing the stops for limiting the downward movement of the shoe, and Fig. 7 represents a side elevation of the front end of the pole and the devices secured thereto for operating the brake lever.

Similar characters designate like parts throughout the several figures of the drawings.

In the drawings, 10 represents the front axle of a vehicle on either end of which is secured a wheel 11. Secured to said axle 10 in any well-known manner is a pole 12 provided with the cross-tree 13 which has pivoted at 14 to each end thereof a brake lever 15 which is adapted to be moved in a horizontal plane about the vertical pivot 14.

To the inner ends of the brake lever 15 is secured the short chains 16 which are connected to the rear end of a chain 17 which extends longitudinally of the pole 12 and connects with one end of a working lever 18 pivoted at 19 to the front end of said pole. The opposite end of said lever 18 is secured to a yoke 20 which has secured at each end thereof a suitable whiffletree 21. The yoke 20 has a slight movement longitudinally of the pole 12 which movement is limited by means of suitable stops such as the walls 22 of the slot 23 in which said lever 18 is pivoted. The outer end of each of the brake levers 15 is provided with a vertical slot 25 in which is mounted a member 26 pivoted at 27 to a horizontal pivot about which said member is adapted to move in a vertical plane, the downward movement of said member being limited by the stops 28 and 29.

The outer end of the member 26 is provided with a suitable brake shoe 30 adapted to engage with the tire of the wheel 11 to retard its movement about the axle 10 when desired. To the pivot 27 is secured a whiffletree 31. Each of the horses or other animals used for drawing the vehicle are harnessed between the whiffletrees 21 and 31 and it is obvious that when the vehicle is moved ahead thereby the strain upon the whiffletrees 31 will cause the brake members 15 to be moved about their pivots 14 and the brake shoe 30 will be disengaged from the wheels 11 to permit them to move freely about the axle 10. It is also obvious that when the vehicle is passing down hill the resistance of the horses or other animals to the load will cause the whiffletrees 21 to be drawn backward and a pull exerted upon the chain 17 which will operate upon the brake levers 15 to move them about the pivots 14 and cause the shoes 30 to impinge upon the wheels 11 thereby retarding the movement of these wheels and preventing the load carried by the vehicle from overcoming the resistance of the horses.

It is obvious that the pressure exerted upon the wheels by the brake shoe is in proportion to the power applied to the yoke 20 at the front of the pole by the resistance of the horses. Should the driver desire to back the vehicle when the brake shoe 30 is in contact with the wheel 11 the movement of the wheel in the direction indicated by the arrow "*a*" in Fig. 3 will cause the shoe to be raised, the members 26 moving about the pivot 27 to disengage the shoe from contact with the wheel, the shoe being retained in this elevated position until the vehicle is again moved forward when it will be permitted to drop into its normal position ready for further engagement with the wheel 11 if desired.

This makes a very simple construction of braking mechanism which is always thrown out of engagement when the vehicle is moving ahead on a level road and which will automatically operate by the resistance of the draft animals to cause an engagement between the brake shoe and the vehicle wheels to retard them when the vehicle begins to move down a hill or other inclination. At the same time it provides a ready means for automatically disengaging the shoe, when in engagement, whenever it is desired to back the vehicle as often occurs when the vehicle is moving down hill.

It is believed that the operation and the many advantages of the invention will be fully apparent without any further description.

Having thus described my invention, I claim:

1. In a vehicle-brake, the combination of a cross-tree; a brake-lever pivoted to each end thereof; a whiffletree secured to each end thereof; means for operating said lever; and a wheel-engaging brake-shoe secured to said brake-lever by a horizontal pivot extending transversely of said lever and adapted to be thrown out of engagement with the wheel of the vehicle when backing.

2. In a vehicle-brake, the combination of a cross-tree; a brake-lever pivoted to each end thereof; means for operating said lever located at the outer end of the pole in front of the draft animals; and a wheel-engaging brake-shoe secured to said brake-lever by a horizontal pivot extending transversely of said lever and adapted to be thrown out of engagement with the wheel of the vehicle when backing.

3. In a vehicle-brake, the combination of a cross-tree; a brake-lever pivoted to each end thereof; a member pivoted to said lever and adapted to move about its pivot in a vertical plane parallel with the axle; a brake-shoe secured thereto; a connector extending from said brake-lever to the end of the pole of the vehicle; and means at the front end of the pole for attaching said connector to the draft animal.

4. In a vehicle-brake, the combination of a cross-tree; a brake-lever pivoted to each end thereof; a member pivoted to said lever and adapted to move about its pivot in a vertical plane parallel with the axle; a brake-shoe secured thereto; a connector extending from said brake-lever to the end of the pole of the vehicle; and a whiffletree secured to the outer end of said connector in front of the draft animals.

5. In a vehicle-brake, the combination of a cross-tree; a brake-lever pivoted thereto and adapted to move about its pivot in a horizontal plane; means for operating said lever; a member pivoted to the outer end of said lever and movable about said pivot in a vertical plane parallel to the axle; a shoe on the end of said member; a whiffletree secured to each end of said cross-tree; and stops to limit the downward movement of said shoe member.

6. In a vehicle-brake, the combination of a pivoted brake-lever adapted to move about its pivot in a horizontal plane; means for operating said lever; a member pivoted to the outer end of said lever and movable about said pivot in a vertical plane; a shoe on the end of said member; stops to limit the downward movement of said shoe member; and a whiffletree secured to the shoe pivot.

7. In a vehicle-brake, the combination of a pole; a cross-tree secured thereto; brake-levers fulcrumed to said cross-tree; a member carrying the brake-shoes pivoted to the outer end of said brake-levers; short chains connected to the inner ends of the brake-levers; a chain connected to said short chains; a retractive member at or near the end of the pole to which said chain is attached; a yoke connected to said retractive member; a pair of whiffletrees connected to said yoke; a pair of whiffletrees connected to the shoe pivot of said brake-levers; and a stop to limit the movement of the yoke.

Signed by me at Clinton Maine this first day of February 1907.

MARTIN JEWELL.

Witnesses:
CORA A. DODGE,
LOTTIE M. DODGE.